W. Cotton.
Knitting Mach.
N° 67,727.   Patented Aug. 13, 1867.
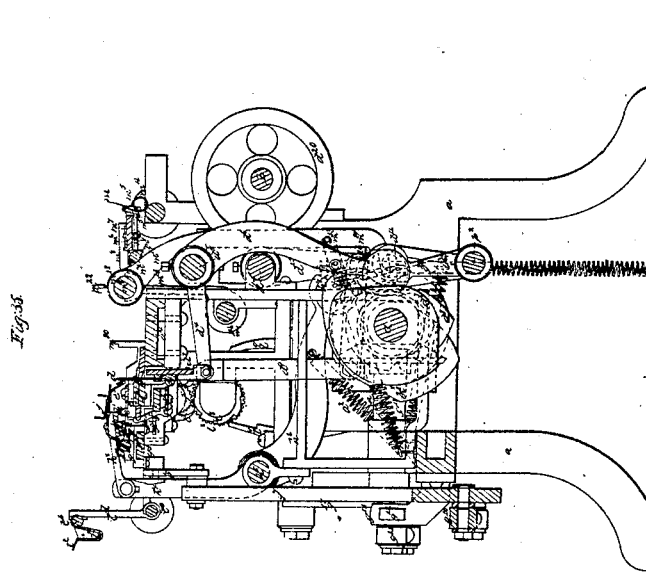
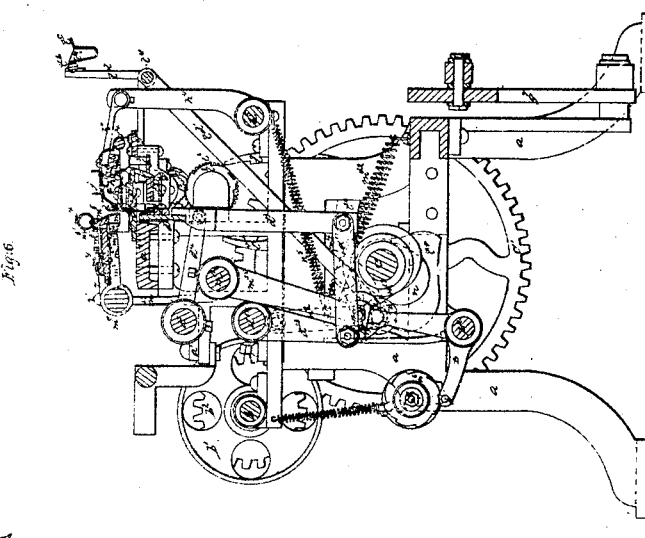
Witnesses:
Inventor:
William Cotton
by his attorney

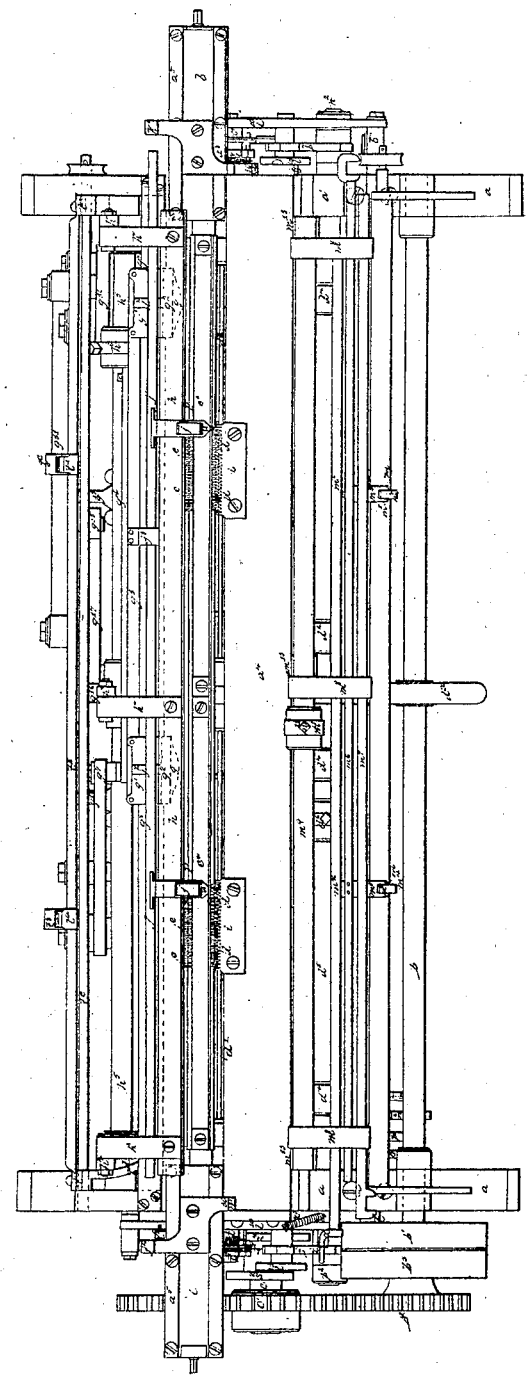

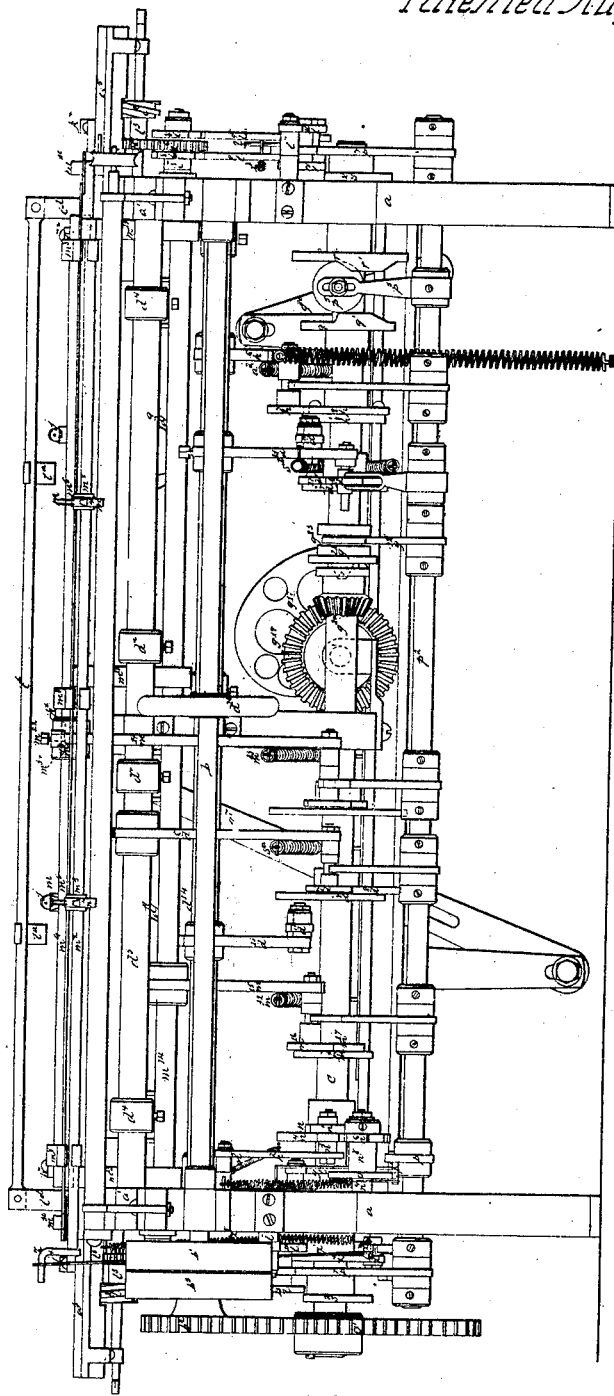

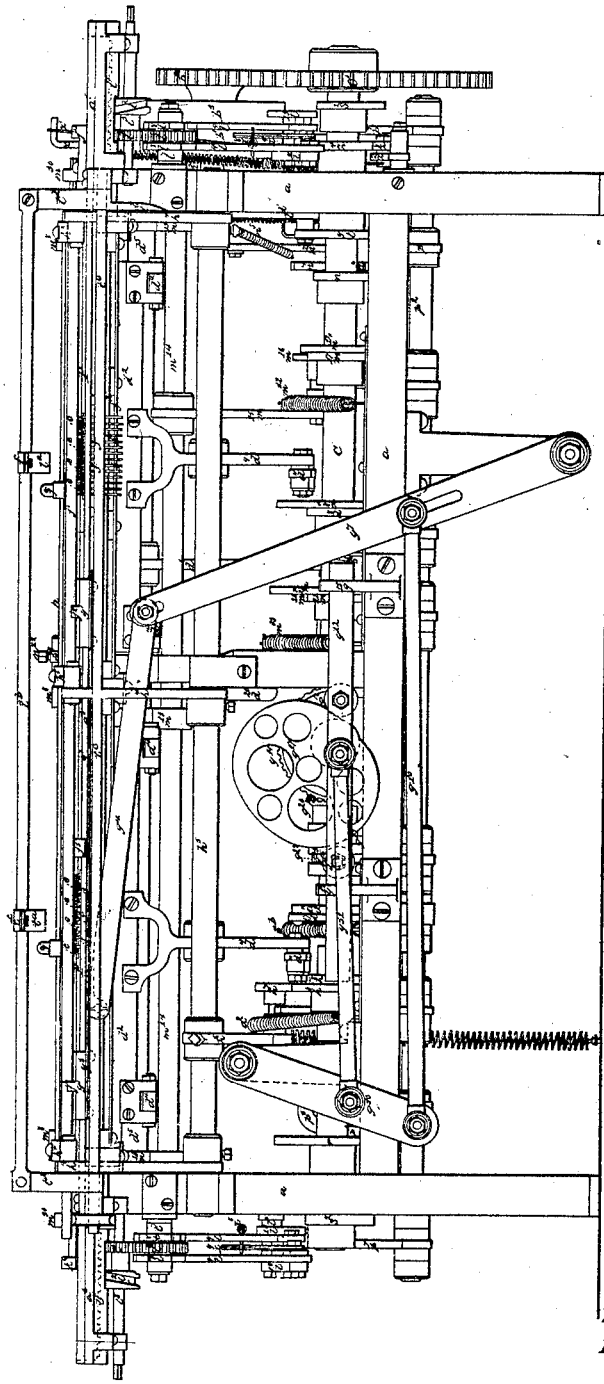

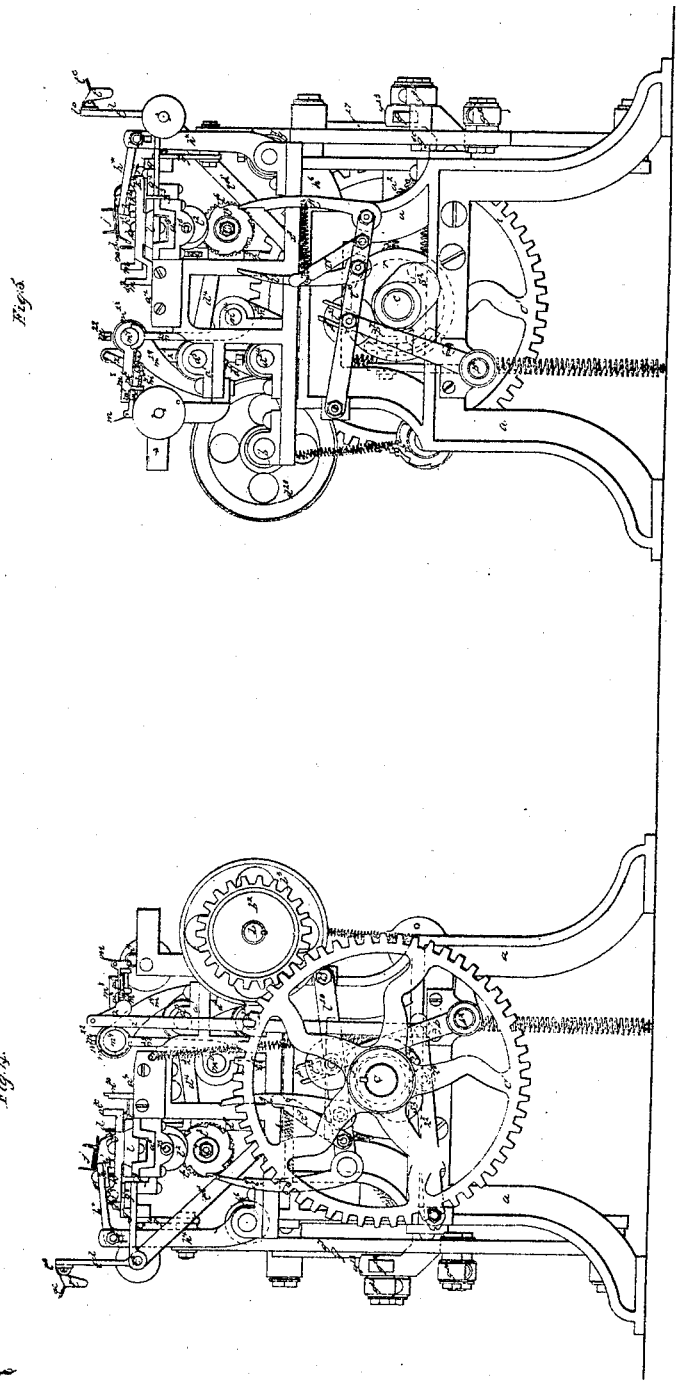

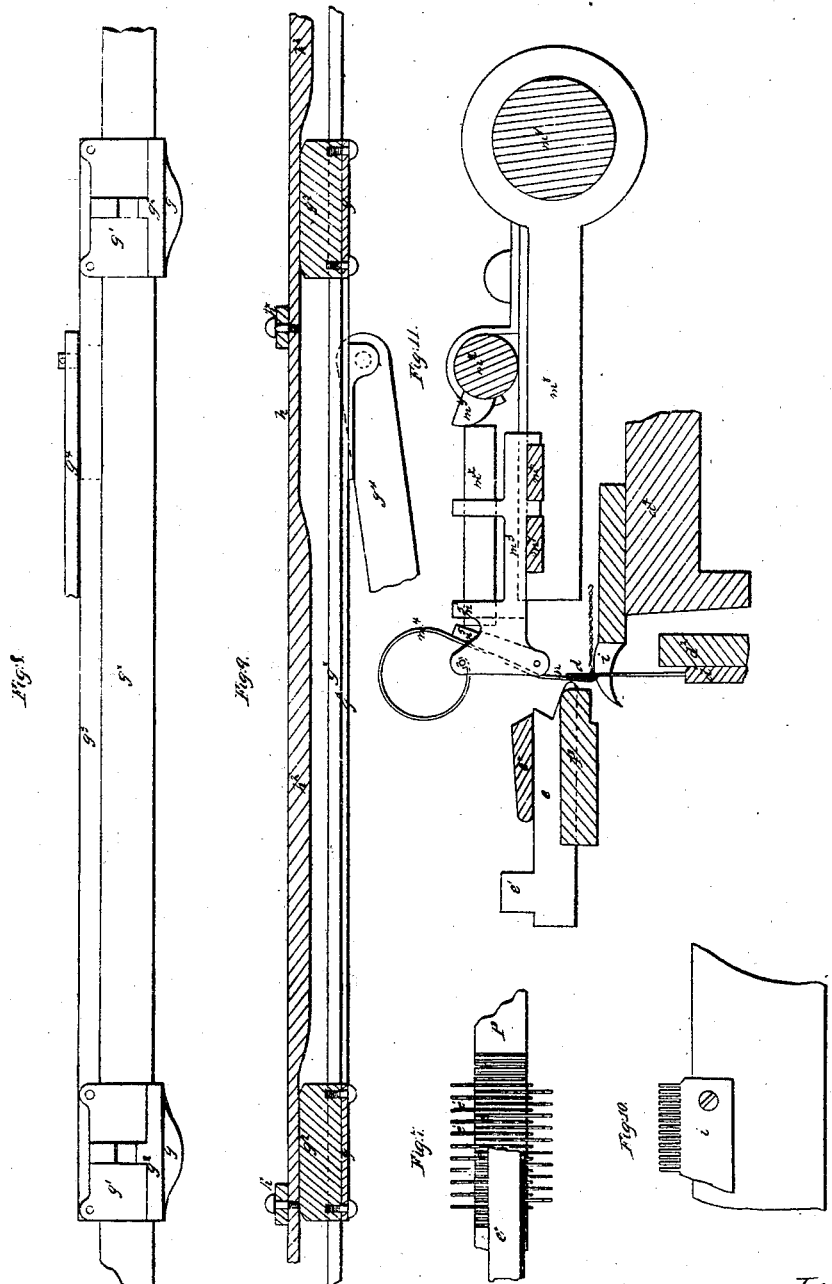

W. Cotton.
Knitting Mach.
N° 67,727.      Patented Aug. 13, 1867.
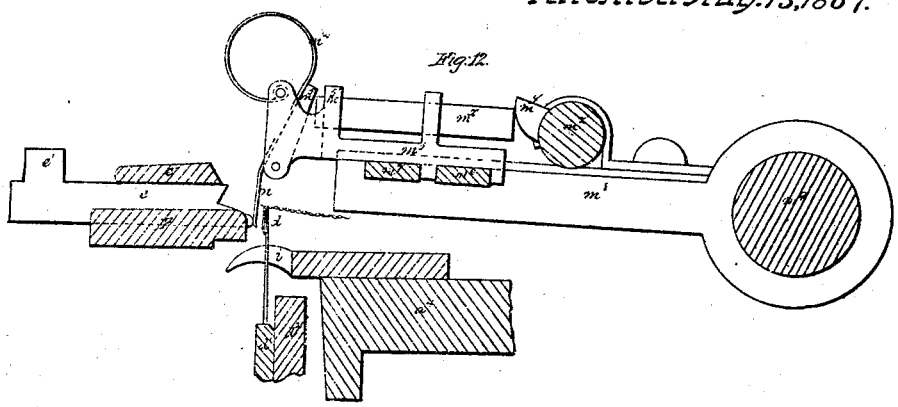
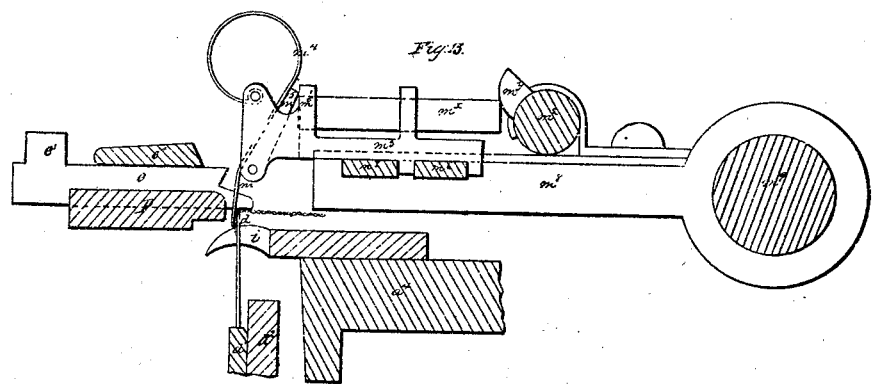
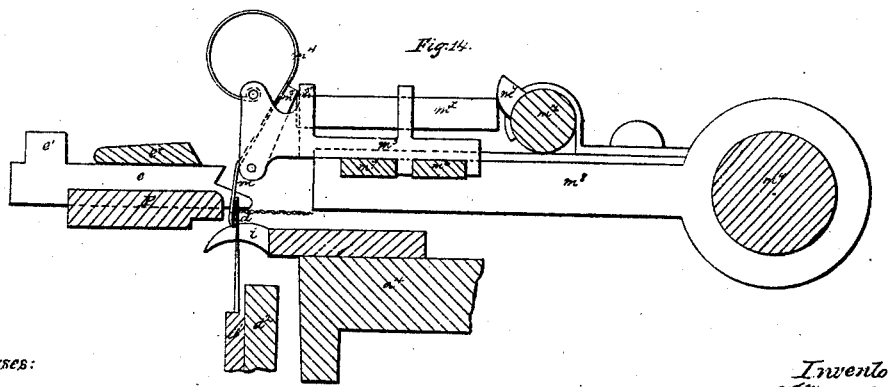

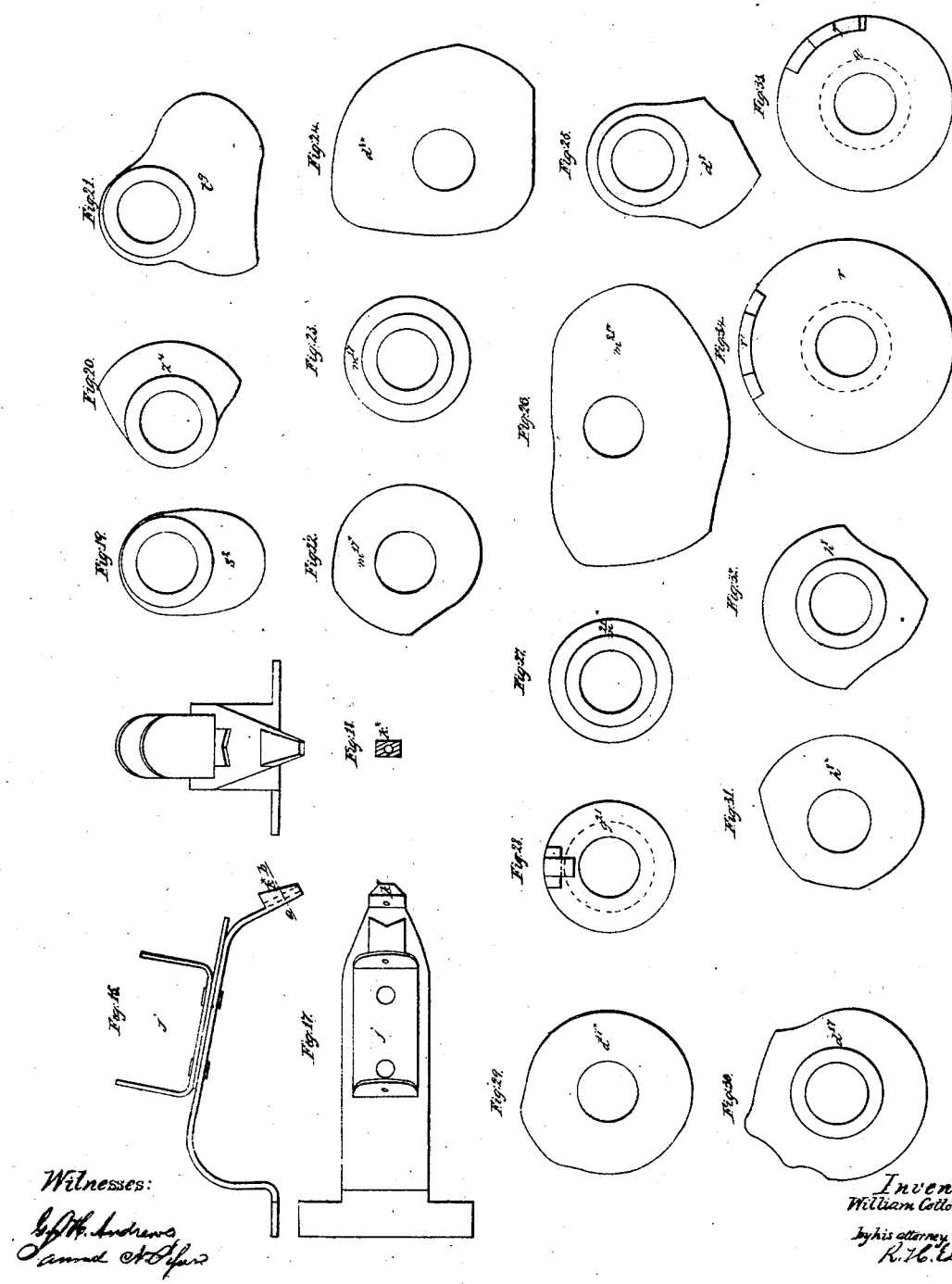

United States Patent Office.

WILLIAM COTTON, OF LOUGHBOROUGH, ENGLAND, ASSIGNOR TO RICHARD S. FAY, OF BOSTON, MASSACHUSETTS, ASSIGNOR TO DUDLEY HOSIERY COMPANY.

*Letters Patent No. 67,727, dated August 13, 1867.*

IMPROVEMENT IN KNITTING MACHINES.

*The Schedule referred to in these Letters Patent and making part of the same.*

TO ALL WHOM IT MAY CONCERN:

Be it known that I, WILLIAM COTTON, of Loughborough, in the county of Leicester, England, manufacturer, have invented improvements in Machinery or Apparatus for the Manufacture of Looped Fabrics; and I do hereby declare that the following is a full and exact description thereof, reference being had to the accompanying drawings, and to the letters of reference marked thereon. Of such drawings—

Figure 1 denotes a top view of a knitting machine containing my invention.

Figure 2 is a front, and

Figure 3 a rear elevation of it.

Figures 4 and 5 are end elevations of it.

Figures 6 and 35 are transverse and vertical sections of it.

Such other figures as may be necessary to better represent those of the operative parts will be hereinafter referred to and described.

The machine contains two series of barbed needles, and two series of sinkers to operate therewith in the formation of loops from yarn laid on or presented to the needles by carriers, and to make at one and the same time two pieces of work, one of which is formed on one side and the other on the other side of the middle of such machine. As, for instance, one leg and half the body of a pair of drawers may be knit on one half of the machine, while another such leg and part of the body are being knit on the other half of the machine. I do not limit my machine to two such divisions, as it may have a greater or different number, so as to make one piece, or more than two pieces of work at once, each of such being formed by means substantially as hereinafter set forth.

Of each series of the sinkers, every other one of them is moved successively by the action of a "slur-cock," the remainder being subsequently moved in a body or all at once, and by a catch-bar and other mechanism, as will be hereinafter explained. Those sinkers which operate in succession I term "jack-sinkers," the others, or those which move in a body or all at once, I term dividers, or dividing-sinkers, in order to distinguish them. The jack-sinkers form loops around pairs of the needles; the dividers, by subsequently being moved forward by what is termed the catch-bar, and while the jack-sinkers are correspondingly moved backward in a body, force the yarn between each two needles of each pair, and thus, by the peculiar operations of the jack-sinkers and the dividers, the yarn will be looped on each of the needles.

One important advantage of the above-mentioned mode of forming the loops, viz, by the jack-sinkers, dividers, and a catch-bar, to operate such in manner substantially as explained herein, is, that it renders the yarn or thread less liable to be broken than when all the sinkers are operated successively. Other advantages will be apparent to persons skilled in the construction and use of what are termed "plane knitting machines." With the sinkers, needles, and yarn-carriers, and their actuating mechanisms, I employ certain grooved needles or instruments for "fashioning," that is, for effecting what is termed narrowing and widening of the work. These fashioning-needles or instruments have mechanism, as will be hereinafter explained, for producing their proper movements. These fashioning-needles are employed to take loops from certain of the bearded needles and transfer them to and upon the others thereof, either to effect the process of narrowing or that of widening the work, as circumstances may require.

In the drawings, $a$ represents the main frame of the machine, it being suitably constructed for supporting the main operative parts. $b$ is the driving-shaft of the machine, it being provided with a fast pulley, $b^1$, and a loose pulley, $b^3$, and supported by boxes upheld by the frame $a$. A small hand-wheel, $d^{20}$, is also fixed on the driving-shaft, for the purpose of enabling such shaft to be revolved by manual power. At one end of the driving-shaft $b$ is a gear, $b^2$, which engages with another gear, $c^1$, fixed on a cam-shaft, $c$, which runs longitudinally and horizontally through the frame $a$, and may be supported in suitable bearings at the ends and middle of the frame. Thus it will be observed that by means of the said gears $b^2$ $c^1$ the cam-shaft $c$ will receive rotary motion while the driving-shaft may be in revolution. $d$ (see figs. 1 and 6) are the barbed or bearded needles, the heads $d^1$ of which are fixed to a needle-bar, $d^2$, shown in figs. 3 and 6, provided with mechanism for imparting to it a compound movement. To this end the needle-bar $d^2$ is jointed to arms $d^4$, projecting from a horizontal shaft, $d^5$, (see figs. 1, 2, and 6,) supported in bearings $a^1$. Another arm, $d^6$, projects downwards from the shaft $d^5$, and carries a roller, $d^7$, which rests against the periphery of a cam or tappet, $d^3$, fixed on the cam-shaft $c$. The vertical movements of the needles are effected by such cam and by means of a spring, $s^a$, which is applied to the arm $d^6$ and the frame $a$, as represented in the drawings. The needle-bar $d^2$ has two other arms, $d^9$, projecting down from it, they being jointed at their lower ends to two links $d^{11}$ $d^{11}$, which are jointed to arms $d^{13}$, projecting down from a rocker-shaft, $d^{14}$. One of the arms, $d^{13}$, bears a truck or roller, $d^{16}$, which rests against a cam, $d^{17}$, fixed on the cam-shaft $c$, a spring, $s^b$, serving to keep the roller up to the cam. The arms $d^9$, links $d^{11}$, arms $d^{13}$, shaft $d^{14}$, and cam $d^{17}$, spring $s^b$ and roller $d^{16}$ serve to produce the forward and back movements of the needles in horizontal directions, both toward and away from the presser-bar P, on and in which the sinkers $e$ are arranged, such movements being to effect the closing of the beards of the needles, and allow them to open by their inherent elasticity, as circumstances may require.

One peculiarity of this machine is that its presser-bar P is stationary, the needles being moved up to and away from it, whereas in most if not all other machines the needles have vertical movements only, and the presser-bar is moved up to them in order to press their beards toward their shanks. This moving of the needles toward and from a stationary presser is an advantage resulting from the necessity of moving the needles back or laterally, in order that the fashioning-needles or instruments may perform their office of seizing the loops. The mechanism for operating the sinkers to effect the formation of loops on the needles, and that for "knocking over" the work or casting it off the needles, may be thus explained: In the drawings the sinkers are shown at $e$, as arranged between two horizontal and stationary bars $e^*$ P, and in grooves made parallel and transversely therein, one of such bars, viz, the lower one, serving as a presser to close the beards of the needles. These sinkers, which are in each half of the machine, are divided into "jack-sinkers" and "dividers," there being a jack-sinker between each two "dividers," as shown in top view in Figure 7. A jack, $f$, is arranged in rear of each of the jack-sinkers. Each jack, near its lower end, has a notch, $f^1$, to receive and enable the jack to be supported by a stationary bar, $f^2$. Another bar, $f^3$, (see fig. 6,) serves to keep the notch astraddle of the bar $f^2$. Each series of jacks $f$ has its jacks actuated in one direction by a slur-cock, $g$, carried by a slur-box in the usual manner. This slur-cock and box are represented in Figure 8, which is a top view of them and their supporting and operating bars. The movement of the dividers in the same direction, and their movements and those of the jacks, simultaneously in the opposite direction, are effected by means of a grooved bar, $h$, which I term the catch-bar, which, for this purpose, is constructed with longitudinal groove or space, formed between two projections, $h^1$ $h^2$, such grooves or spaces to receive projections $e^1$ raised on the sinkers. When the slur-cocks are in action on the jacks, the projections $h^2$, (shown more particularly in Figure 9, which is a longitudinal section of the catch-bar $h$, and the projection $g^2$ of the slur-box $g^1$,) will be so acted on by the projection $g^2$ of the slur-box as to raise the catch-bar $h$ out of the way of the said projection $e^1$ of the sinkers; but, when the slur-cock may have finished its traverse, the projection $g^2$ of the box $g^1$ will have passed from under the projection $h^2$, thereby ceasing to support the catch-bar $h$, which, falling upon the sinkers, will embrace their projections $e^1$, so that, when actuated for the purpose, the catch-bar will retract all the sinkers simultaneously. The catch-bar also operates to move the dividers forward. This is accomplished by the front edge of the projection $h^2$, which is somewhat lower than the projection $h^1$. The said front edge, by being forced in contact with the rear edge of the dividers, drives the dividers forward until their projections $e^1$ come into line with those of the jack-sinkers. When this takes place the catch-bar falls and receives all the projections $e^1$ into its groove. The movement of the catch-bar $h$ is obtained by that bar having arms, $h^4$, which are hinged to the upper ends of arms $h^4$, projecting upward from a rocker-shaft, $h^5$. (See figs. 1 and 3.) An arm, $h^6$, extending from the shaft $h^5$, carries a roller, $h^7$, which is borne by a spring, $a^2$, against a cam, $h^8$, affixed on the shaft $c$. The "knocking over" of the work is effected by a stationary comb, $i$, affixed to the main cross-bar $a^1$. (See fig. 6, also Figure 10, which is a top view of the comb.) The work lies on the comb, and extends horizontally, or about so, out of the machine. The descent of the needles between the teeth of the knocking-over comb will cause the needles to draw the yarn down through the loop of the work, so as to form new loops, through which the needles are to be subsequently raised for the purpose of receiving a fresh supply of yarn, laid on them by the thread-carrier. In the drawings of the machine there are two thread-carriers, $j$ $j$, they being projected from a cylindrical rod, $j^1$, which rests and turns in bearings $j^2$ made in the slur-boxes $g^1$. These slur-boxes are connected together by a bar, $g^3$, and slide lengthwise on another or stationary bar, $g^x$. A spring-brake, $j^3$, affixed to the bar $g^3$, curves around and embraces the rod $j^1$, and exerts a frictional pressure thereon, by which the said bar will be moved lengthwise with the bar $g^3$ until estopped, as hereinafter described. As the thread-carriers reach either end of their traverse, they will be stopped by contact with one of two adjustable stops, $j^4$ $k^4$, arranged as shown in fig. 1. Each of these stops is provided with mechanism for adjusting it in position, either nearer to or further from the middle of the machine. This adjustment of the stop is to enable the traverse of the thread-carrier to be increased or diminished, as circumstances may require in the process of "fashioning." The adjustment of the stops, as occasion may require, is effected by mechanism to be described. I apply the stops $j^4$ $k^4$ to sliding-carriages $l$ $l$, suitably supported by and so as to be capable of being slid or moved lengthwise in posts $a^5$ $a^5$ of the main frame. (See fig. 1.) Each of such carriages $l$ has a worm-rack, $l^1$, on its bottom to receive a worm, $l^2$, carried by a shaft, $l^3$, supported by the part $a^1$. A pinion, $l^5$, is fixed on the said worm-shaft, and engages with a gear, $l^7$, provided with two ratchets, $l^8$, which are fastened to it, and with the gear revolve freely on a stationary stud, $l^7$. Two clawkers or pawls, $l^9$, carried by a lever, $l^{10}$, operate with the two ratchets, there being one pawl to each ratchet, and the whole being as shown in each of the end elevations. (Figs. 4 and 5.) Each lever, $l^{10}$, turns on a stationary fulcrum, $l^{11}$, and carries a roller, $l^{13}$, which revolves and slides freely on a pin projecting from the lever. A helical spring, $x^3$, connects the two pawls, and serves to keep either of them up to a ratchet, while the other is kept out of action with its own ratchet by one of two catches, $x^9$, arranged as represented, and applied to and so as to be capable of turning on a stud projecting from the lever $l^{10}$. A forked arm, $p^7$, projecting from a shaft, $p^2$, engages with the hub of a roller, $l^{13}$; that is to say, the fork of the arm embraces the hub and enters a groove made in and around it. When the shaft $p^2$ is moved endwise the arm $p^7$ will correspondingly move the roller $l^{13}$; that is, so as to throw it either on or off a cam, $s^2$, fixed on the cam-shaft $c$. The said cam, by its action on the roller $l^{13}$, will produce an upward motion of the lever $l^{10}$, carrying the pawls $l^9$, the lever being moved in the opposite direction by its inherent weight and that of the parts supported by it. This upward movement of the lever will cause either of the pawls to actuate its ratchet so as to revolve the gear $l^5$. This gear, acting with the pinion $l^3$, will cause it to revolve the worm-shaft $l^1$, and thus put in movement the adjustable stop $j^4$ or $k^4$ over such worm-shaft. The direction in which the stop will be moved will depend on which pawl may be in action. The stop is to be moved outward when the work is to be "widened," and inward when it is to be "narrowed."

As this machine is calculated to produce two separate fabrics at one and the same time, we shall now describe the mechanism for moving the slur-boxes $g^1$, of which there is one for each of such fabrics. The movements of the slur-boxes cause not only the movement of their slur-cocks, but by means of the spring-brake hereinbefore mentioned, effect the requisite movements of the rod carrying the thread-carriers. A connecting-rod, $g^4$, jointed to the bar $g^3$, is also jointed to the upper end of a lever, $g^7$. (See fig. 3.) This lever, by means of a connecting-rod, $g^{19}$, is also connected to another lever, $g^{30}$, which, by a rod, $g^{31}$, is connected to a slide-bar, $g^{12}$. This slide-bar moves longitudinally in stationary guides, $g^{13}$, and carries two bowls or rollers, $g^{15}$ $g^{16}$, whose peripheries rest against opposite sides of the periphery of a cam, $g^{17}$, fixed on a transverse shaft, $g^{18}$. This shaft has a bevelled gear, $g^{19}$, fixed on it, which engages with another bevelled gear, $g^{20}$, affixed on the cam-shaft $c$. From the above it will be seen that during the revolution of the cam $g^{17}$ the bar $g^3$ will be moved back and forth longitudinally. The gear $g^{20}$ revolves freely on the shaft $c$. A forked arm, $g^{22}$, extending from the shaft $p^2$, enters the groove $g^{23}$ of a clutch, $g^{21}$, which revolves with the shaft $c$, and slides thereon, and serves to engage the gear $g^{20}$, or disengage it from the shaft, the engagement being such as to cause the shaft to be revolved by the gear. The gear $g^{20}$ is to be in engagement with the shaft $c$ while plain work is being made by the machine, but when the work is being fashioned, the gear is to be out of engagement with the shaft. When fashioning is to be carried on, the fashioning-needles $m$ are brought into position with respect to the needles $d$, as represented in Figure 11. At other times these instruments are to be turned back or thrown out of action, which can be done by revolving their arms $m^8$ on the shaft $m^9$ with which they are connected. Each of these instruments $m$ is formed with a groove in its side, which comes next the needle $d$, the same being so as to cover or receive the beard of the needle. Each instrument $m$ is also bent or curved a little near its point, in order that it may readily enter that part of the beard recess of the needle which is below the point of the beard. The machine shows two of these fashioning-needles to each carrier $m^3$, they being projecting from a lever, $m^5$, which is arranged within, and has its fulcrum supported by the carrier. A spring, $m^4$, is applied to each lever and carrier. A slide-rod, $m^x$, extending through the carrier, is borne against the lever by the action of a long cam, $m^y$, from the shaft $m^z$. There are two such cams on the shaft, and the shaft at the proper times is turned in its bearings so as to bring them into and out of action with respect to the slide-rod $m^x$. The shaft $m^z$ has a crank, $z$, on one end, which is connected to a lever, $z^2$, by a connecting-rod, $z^1$. (See fig. 4.) This lever carries a friction-roller, $z^3$, which rests on a cam, $z^4$, carried by the cam-shaft $c$. A spring, $z^5$, bears the friction-roller up to the cam. The purpose of the cam $z^4$, the roller $z^3$, and the lever $z^2$, the connecting-rod $z^1$, and the crank $z$, is to cause the fashioning-needles $m$ to press upon the barbs of the needles $d$, and enter their grooves in order that the points of the needles $m$ may enter and take up the stitches on the needles $d$. The upper arm of each of the levers $m^5$ brings up against a stop, $m^{5\prime}$, fixed on the carriage. The levers $m^5$ are fixed to separate carriages, $m^3$, which are projected from separate bars, $m^6$ $m^7$; that is, one of such carriages is fixed to one, and the other to the other of such bars. The said bars $m^6$ $m^7$ are supported so as to be capable of being slid longitudinally on arms $m^8$, projected from a shaft, $m^9$. These bars $m^6$ $m^7$ are notched upon a projection, $m^{30}$, extending from the two adjustable stops $j^4$ $k^4$, the same being as represented in fig. 1. The bars $m^6$ $m^7$, by their connection with the adjustable stops, receive motion therefrom in opposite directions. The shaft $m^9$ is supported by, and so as to be capable of turning on, the upper ends of arms $m^{13}$, (see figs. 1 and 2,) affixed to and projecting upward from a rocker-shaft, $m^{14}$, which has affixed to it an arm, $m^{15}$, which carries a friction-roller, $m^{16}$, which rests against the periphery of a cam, $m^{17}$, fixed on the cam-shaft $c$. A spring, $m^{32}$, fixed to the arm $m^{15}$ and the frame, keeps the roller up to the cam. By means of the arms $m^{13}$, the shaft $m^{14}$, arm $m^{15}$, roller $m^{16}$, cam $m^{17}$, and spring $m^{32}$, a slight to-and-fro movement in a horizontal direction will be imparted to the fashioning-needles $m$, the same being to enable them to pass over the heads of the knitting-needles $d$. From the shaft $m^9$ an arm, $m^{19}$, carrying a friction-wheel, $m^{20}$, extends, such wheel being borne by a spring, $m^{33}$, against a cam, $m^{21}$, fixed on the cam-shaft $c$. The head $m^{18}$ of the arm $m^{19}$ turns of the shaft $m^9$, and is held thereto by a set-screw, $m^{22}$, which enters a recess or slot, $m^{34}$, made in the shaft. By unscrewing the set-screw the shaft may be turned in its bearings so as to throw the fashioning-instruments out of action with the needles $d$. The cam $m^{21}$ and the spring $m^{33}$ aid in effecting the vertical or up-and-down movements of the fashioning-needles.

Figures 12, 13, and 14 show a fashioning-needle, $m$, in either of its positions it assumes in operating for the change of a loop, while the fashioning is being effected. In fig. 11 the fashioning-needle $m$ is represented as resting against and so as to receive into its groove the beard of one of the needles $d$, the needle $m$ being in the act of seizing a loop from the needle $d$. In fig. 12 the fashioning-needle $m$ is shown in the act of transferring a loop, and in fig. 13 it is exhibited as holding the loop in a position to deliver it upon the needle $d$ destined to receive it; the fabric in such figures being shown in red lines. Fig. 14 exhibits the position of the fashioning-needle $m$, after the transfer of the loop to and upon a needle, $d$.

In this machine certain of the cams hereinbefore described were employed for operating the needles $d$ and other parts, in order to produce a fabric of uniform width; but when there is to be produced a variation in the width of the fabric, that is to say, when fashioning of it is required, I bring other cams into operation, in order to effect the requisite motions of the main needles. For this purpose the friction-rollers $d^7$, $d^{16}$, $h^7$, $m^{16}$, $m^{20}$ are first shifted to and upon or against the additional cams $d^{3*}$, $d^{17*}$, $h^{8*}$, $m^{17*}$, and $m^{21*}$ fixed on the shaft $c$. The rollers $l^{13}$ are to be on the cams $s^2$. After the fashioning has taken place the rollers $d^7$, $d^{16}$, $h^7$, $m^{16}$, and $m^{20}$ are changed back to the cams for doing the plain work, and the rollers $l^{13}$ are moved off their cams $s^2$. The shifting of the rollers is effected by mechanism, which may be thus described: Upon the shaft $c$ (see fig. 2) is a cam, $n$, which, during its rotation, acts on a roller, $n^1$, supported by and so as to be capable of being revolved on a stud, $n^3$, which carries a driver or pawl, $n^4$. The stud projects from a lever or arm, $n^2$, provided with a spring, $n^5$, to draw the roller $n^1$ against the cam $n$. The driver or pawl $n^4$ operates with a ratchet, $n^6$, fixed on a tubular shaft, $n^8$, which turns on a stationary arbor, $n^9$. A cam, $o$, is fixed on the shaft $n^8$. This cam acts against a projection or stud, $p^1$, extending from an arm, $p$, projecting from the shaft $p^2$. Another arm, $p^3$, extends up from the shaft $p^2$, and carries a friction-roller, $p^5$, against which a cam, $q^1$, projecting from the side of a wheel, $q$, fixed on the shaft $c$, operates. The operation of the cam $n$, while revolving, is such as to cause the pawl $n^4$ to actuate the ratchet $n^6$, whereby the cam $o$ will be revolved so as to effect a movement of the shaft $p^2$, such as will throw the roller $p^5$ into or out of the path of movement of the cam $q^1$. Such cam, while the shaft $c$ is in revolution, will so act against the roller as to cause the shaft $p^2$ to be moved longitudinally, so as to change the rollers $d^7$, $d^{16}$, $h^7$, $m^{16}$, and $m^{20}$, to and upon the additional or fashioning-cams hereinbefore mentioned. A cam, $r^1$, fixed on the side of a wheel, $r$, which is fixed on the shaft $c$, by acting against the roller $p^5$ at the proper time, will cause the shaft $p^2$ to be slid in an opposite direction, so as to move the rollers $d^7$, $d^{16}$, $h^7$, $m^{16}$, and $m^{20}$ off the fashioning-cams and upon the other cams, or those by which the plain work is effected. It will be observed that the surface of each of the thread-carriers next the needles is formed flat, or nearly so, as is indicated by the separate views of them, as shown in Figures 15, 16, 17, and 18, where $k^*$ represents the flat part. The object of this part $k^*$ is that when, in fashioning, the thread-carrier may stop opposite a needle, the part $k^*$ may act to close the beard of the needle so as to prevent the thread from being caught by the beards of the next adjacent needles.

The next parts of the mechanism to be described are those for oiling the threads or yarn, and for taking up its slack or drawing it tight for a correct formation of the selvedge or edge of the work.

In the drawings, $t^a t^a$ represent two oil vessels or holders fixed on a horizontal rod, $t^b$, and provided with two perforated thread-guides, $t^c t^c$. The threads or yarn, before being passed through the thread-carriers, are led through the said guides and against sponges, or their equivalents, placed in the vessels $t^a t^a$, and saturated with oil. By running or being drawn in contact with the sponges, the yarns will be oiled. The rod $t^b$ is supported by two arms, $t^d t^d$, projecting up from a horizontal shaft, $t^g$. (See fig. 3.) One of the said arms $t^d$ constitutes part of a lever, whose lower arm $t^{d1}$ carries a friction-roller, which rests against and is moved by a cam, $t^x$, fixed on the cam-shaft $c$. During the revolution of such cam, and at the proper time, the lever will be moved so as to move the lubricating-boxes and their thread-guides in a manner to cause the slack of the yarn at each selvedge to be taken up, or the yarn to be drawn tight, so as to make a good or proper selvedge.

Figures 19, 20, 21, 22, 23, 24, 25, 26, 27, 28, 29, 30, 31, 32, 33, and 34 exhibit the cams hereinbefore mentioned, each being marked with its appropriate designating letter.

Although I have described certain mechanism claimed in a patent numbered 59,892, of United States Patents, and granted to me on the twentieth day of November, A. D. 1866, I do not herein intend to claim such. I have been obliged to represent most if not the whole of such mechanism in order to clearly exhibit the connection and relation of the parts constituting my present invention which relates to the mechanism for oiling the thread or yarn, and taking up its slack or drawing it tight for a correct formation of the selvedge or edge of the work.

What I claim as my present invention is as follows, viz:

I claim the arrangement as well as the combination of the oiling-box $t^a$ and the perforated guide-lip $t^c$ with the horizontal rod $t^b$, provided with mechanism for operating it as set forth.

I also claim the combination of the guide-lip $t^c$, and its supporting rod $t^b$, provided with mechanism for operating it as described, with the main needles, their "knocking-over" comb and presser, and their sinkers; the said guide-lip and rod, and their operative mechanism, being for taking up the slack of the yarn, as and for the purpose hereinbefore set forth.

In testimony whereof I, the said WILLIAM COTTON, have hereunto signed my name to this specification in presence of two subscribing witnesses.

WILLIAM COTTON.

Witnesses:
FRAS. GEO. RAWSON, *United States Consular Agent, Nottingham.*
F. HUBBARD, *Nottingham.*